Sept. 24, 1963 A. H. BOBECK 3,105,226

MAGNETIC MEMORY ARRAYS

Filed April 24, 1961 2 Sheets-Sheet 1

INVENTOR
A. H. BOBECK
BY S E Hollander
ATTORNEY

Sept. 24, 1963 A. H. BOBECK 3,105,226

MAGNETIC MEMORY ARRAYS

Filed April 24, 1961 2 Sheets-Sheet 2

INVENTOR
A. H. BOBECK
BY S E Hollander
ATTORNEY

United States Patent Office 3,105,226

Patented Sept. 24, 1963

3,105,226

MAGNETIC MEMORY ARRAYS

Andrew H. Bobeck, Chatham, N.J., assignor to Bell Telephone Laboratories, Incorporated, New York, N.Y., a corporation of New York Filed Apr. 24, 1961, Ser. No. 104,930
22 Claims. (Cl. 340—174)

Figure 1:
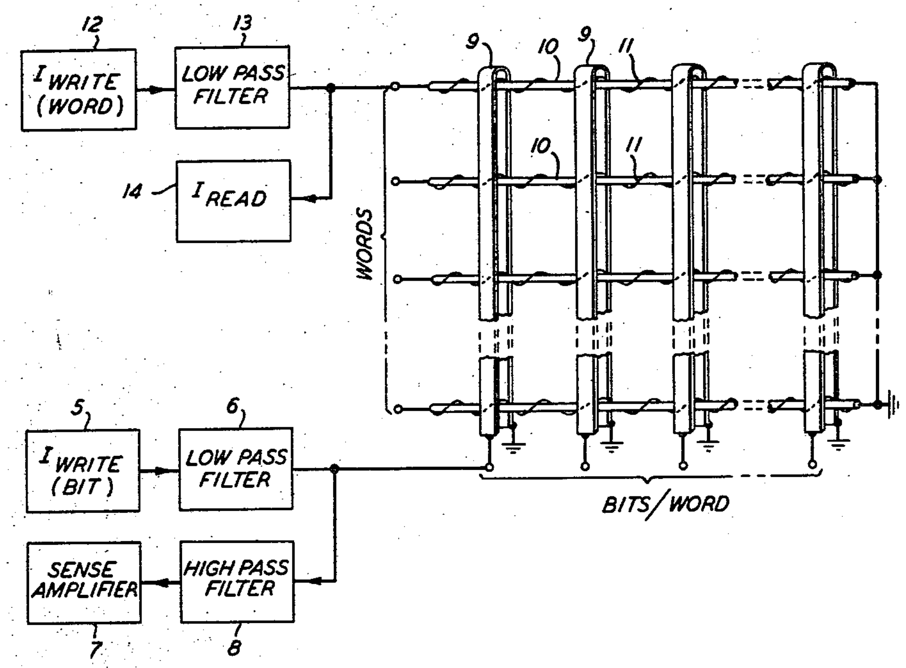

This invention relates to memory arrays and, more particularly, to read and write circuits to be incorporated therewith.

Memory arrays and, more specifically, magnetic memories very often utilize coincident currents for read and write operations. An individual conductor is coupled to each element in a particular row. Similarly, there is a conductor coupled to every element in each column of the array. Currents are applied to vertical and horizontal conductors, each current being insufficient in itself to set the remanent magnetization of the memory elements. However, those elements coupled to both selected row and column conductors have applied to them twice the magnetomotive force applied to other elements in the array. The remanent magnetizations of these elements are set.

The arrays in which a single row and a single column conductor are selected are bit-organized. Each element represents an isolated bit of information and its magnetization is set by the simultaneous energization of the vertical and horizontal conductors coupled to it. First polarity currents are used for writing into the elements, that is, to set them in a first magnetization state. Second polarity currents are used for reading the elements. Only those elements previously set by write current pulses are switched by the application of the coincident read pulses. A common sense winding coupled to all elements in the array detects the presence or absence of a flux reversal in the particular selected element and determines whether that element was previously written into.

On the other hand, magnetic memory arrays may also be organized on a word basis. For example, all elements in each row may represent different bits of the same word. In word-organized arrays, words rather than bits are written and read at any time. Thus, when it is desired to write a particular word in the array, one-half of the requisite switching current is applied to one row conductor. At the same time currents are applied to those column conductors connected to the particular memory elements in the row that are to be set. The elements of the row connected to the column conductors to which currents are not applied are not set as only half of the switching magnetomotive force is applied to them.

When it is desired to read out a particular word from the array it is not necessary to apply coincident currents to the particular row conductor and all of the column conductors. Because every bit in the word must be read to determine the word stored, a sufficient switching magnetomotive force must be applied to every element in the row rather than to particular bits as in bit-organized arrays. A large current pulse is applied to the particular row conductor, this current benig sufficient to switch each element in the row. Those elements previously set switch magnetization state, inducing voltages in the respective column conductors. Sense amplifiers, connected to the column conductors, detect these induced voltages and determine the respective bits of the word.

In both bit and word-organized arrays it is often dangerous to read immediately after a write operation. A fundamental problem in the design of large size memories results from the storage of energy by reactive components such as wire inductance or stray capacitance. This energy, usually stored during the writing process is slowly released and acts to mask the output signal during the reading time. That is to say, the induced voltages on the sense winding in the bit-organized array or on the column conductors in the word-organized array may result not from the switching of magnetization states due to the read pulses but rather from oscillating energy stored in the parasitic reactive components associated with the array by the write pulses. A typical solution to this problem is to widely separate the write and read operations thus allowing sufficient time for the write transients to dissipate themselves. This restriction on the speed of operation is very often disadvantageous.

It is often desirable not only to read immediately subsequent to a write operation but even simultaneously to read from and write into different bits or words in the array as well, such as in many asynchronous systems where precise timing is difficult or impossible to achieve. In bit-organized arrays this is generally impractical. The read and write operations consist of the application of oppositely directed currents to individual row and column conductors. If it is desired to read from an element in the same column as an element into which it is desired to write, oppositely directed currents must flow in the same vertical conductor; this is impossible.

A similar problem arises when it is desired to read one word and simultaneously write another in a word-organized array. The column conductors are used both for writing bits of information and for sensing flux reversals in the interrogated elements. The voltages induced in these conductors by flux reversals in the interrogated elements oppose the currents in these conductors which are to set the elements being written into. One operatino may affect the other, with neither being performed satisfactorily.

In word-organized arrays still another problem is encountered. The column conductors are used for both writing bits of information and for sensing flux reversals during interrogation. Thus, these conductors have connected to them current sources for writing and sense amplifiers for reading purposes. The write currents are generally much greater than the currents induced during interrogation. These large write currents often "block" or stun the sense amplifiers. The write currents store energy in the reactive components of the sense amplifiers, this energy oscillating until it dissipates itself. During this interval of oscillation, the read signals may be masked. For this reason it is often necessary in many word-organized arrays to delay the read operation after the write operation for a time interval that is sufficient to allow the sense amplifiers to become "unblocked."

It is an object of this invention to provide improved bit and word-organized arrays and more specifically to improve the operation of magnetic memory arrays.

It is another object of this invention to read bits of information and even words immediately subsequent to the write operation.

It is another object of this invention to provide for independent and even simultaneous reading and writing in both bit and word-organized arrays.

It is another object of this invention to provide a word-organized memory array wherein the sense amplifiers are unaffected by the write pulses and "blocking" does not occur.

It is still another object of this invention to accomplish the above objects with the use of passive elements only.

In one illustrative embodiment of my invention comprising a word-organized array, the read and write pulses have different magnitudes, durations and rise times, as well as opposite polarities. Thus, the frequency spectra of the read and write pulses are different and essentially non-overlapping, the write pulses being considerably longer than the read pulses and having a delayed rise time with a corresponding lower frequency spectrum. Low-pass filters are interposed between the write current generators and the row and column conductors and keep out of the memory itself all high frequency components during the write operation.

The write pulses, containing a low frequency spectrum, result in low frequency oscillations by the energy stored in the reactive components. High-pass filters are located at the inputs of the sense amplifiers. The voltages induced in the column conductors by the stored energy have low frequencies, are rejected by the high-pass filters, and are thus not detected by the sense amplifiers.

The read pulses induce voltages of fast rise time and short pulse width in the column conductors. These pulses of high frequency content are passed by the high-pass filters to the sense amplifiers. Thus, the read operation may be performed immediately subsequent to the write operation, even before the write transients have dissipated themselves, as only voltages induced by the read pulses are transmitted to the sense amplifiers. Masking cannot occur.

In a similar manner, the write pulses do not "block" the sense amplifiers. The write pulses have a low frequency spectrum which is not passed by the high-pass filters to the sense amplifiers. It is not necessary to delay the read operation until the sense amplifiers have become "unblocked," or alternatively to provide complex and costly "nonblocking" equipment or separate sense windings not connected to the write pulsing equipment.

The use of different frequency spectra for the read and write pulses further permits independent and even simultaneous read and write operations. The large magnitude of the read pulse applied to a particular row causes rapid switching of all elements in this row. The induced high frequency signals in the vertical conductors pass through the high-pass filters to the sense amplifiers. There is no masking by the longer pulse width write pulses applied to the same conductors as these pulses have a low frequency content.

In a second illustrative embodiment of my invention comprising a bit-organized array, the read and write pulses again have different magnitudes, durations and rise times, as well as opposite polarities. The frequency spectra are nonoverlapping and the low-pass filters interposed between the write current generators and the row and column conductors keep out of the memory itself all high frequency components during the write operation.

The sense winding is coupled to each element in the array and the single sense amplifier is connected to this conductor. In conventional arrays it is not possible even with bit-organized memories to read and write independently and even simultaneously because the sense amplifier is affected by the write pulses. By interposing a high-pass filter between the sense conductor and the sense amplifier, as in the word-organized array, the sense amplifier does not respond to memory elements switched by the low frequency write pulses, even if they occur together with read pulses.

It is a feature of my invention that energy stored parasitically in the writing process in an array of bistable elements is prevented from interfering with the output signal during the read-out process by providing different frequency spectra for the writing and reading energizing signals. More specifically, in accordance with certain specific embodiments of my invention the bistable elements are magnetic devices.

It is another feature of my invention that the read pulses applied to the memory array be of shorter duration and of shorter rise time and have a larger magnitude than the write pulses.

It is still another feature of my invention that filters be utilized to filter out low frequency components in the signals read out from the array and applied to the output signal detectors.

Figure 2:
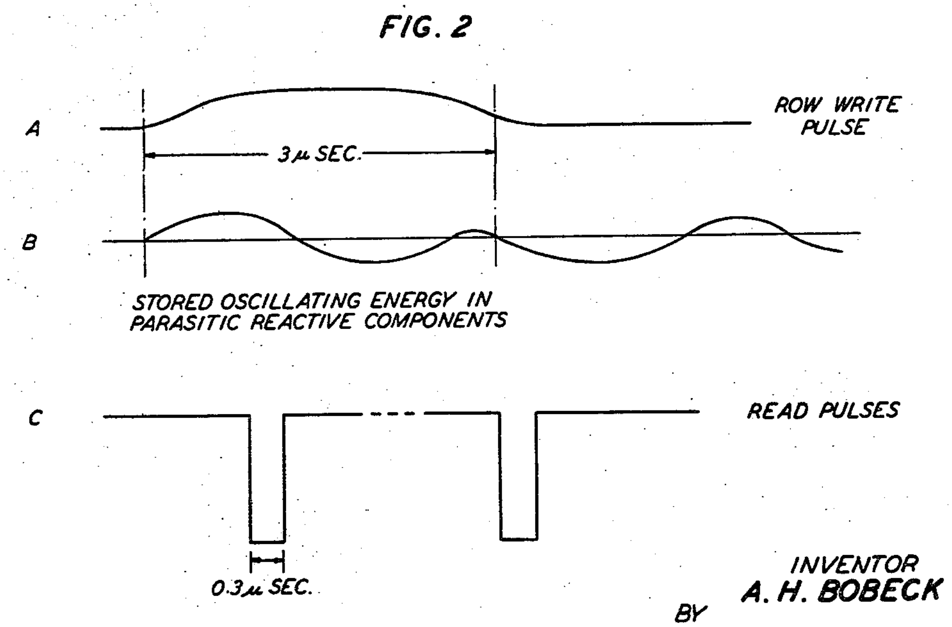
Figure 3:
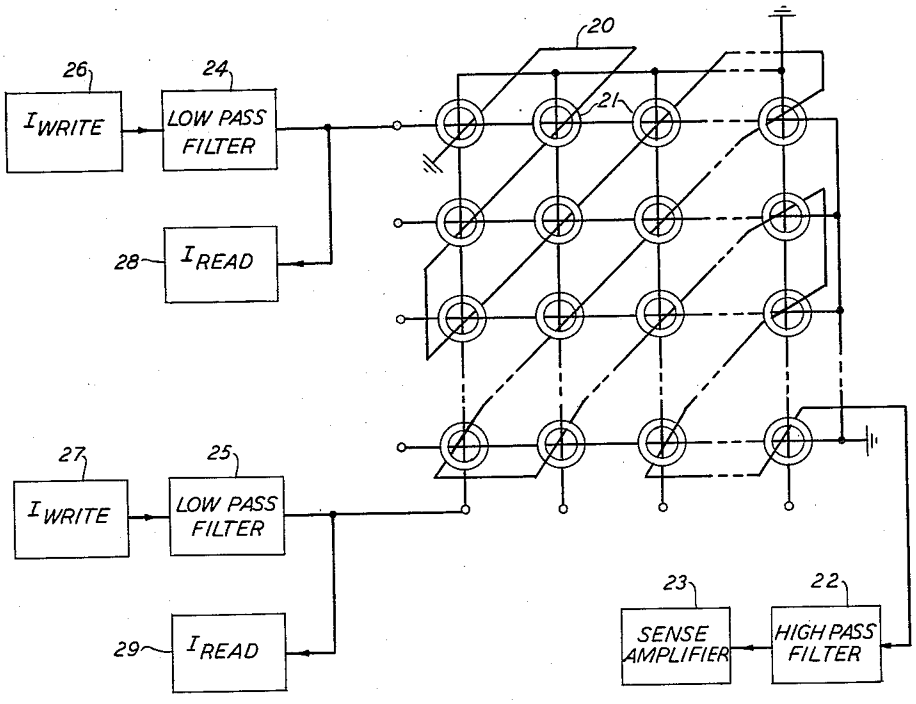

A complete understanding of this invention and of the various features thereof may be gained from consideration of the following detailed description and the accompanying drawing, in which FIGS. 1 and 3 are schematic representations of two illustrative embodiments of my invention and FIG. 2 shows illustrative pulse waveforms utilized in the invention.

Referring now to FIG. 1, the invention is applied to a twistor word-organized array. The twistor magnetic device itself is disclosed in my application Serial No. 675,522, filed August 1, 1957, now Patent No. 3,083,353, issued March 26, 1963. The twistor array disclosed in this copending application accomplishes the storage of information as represented by a particular magnetic state in a new and simpler manner, involving fewer structural elements, and affording advantages not heretofore known. A preferred magnetic flux path is established in each magnetic conductor 10. This preferred path is represented in FIG. 1 by the helix 11. An information bit may be stored in this conductor memory element by passing a current through the magnetic conductor 10 itself and through a conventional electrical conductor 9 inductively coupled to conductor 10. The simultaneous application of currents to conductors 9 and 10 sets a magnetic flux of a particular direction along the preferred path 11. Each intersection of a conductor 9 and a conductor 10 stores one bit of information. The bit is represented by the direction of flux along the preferred path 11, this direction being a function of the polarities of the currents applied to conductors 9 and 10.

In FIG. 1 bits of information are written into the memory by applying write currents to conductors 9 and 10 in the directions shown. These currents produce fluxes along the helical path 11 in a direction from right to left at those intersections to which both currents are applied. Read out is accomplished by applying a read pulse to a row conductor 10 in the direction shown. This current is large enough in magnitude to switch the direction of flux along the preferred path 11. The reversals of flux at the intersections induce voltages in conductors 9 which are detected by sense amplifiers 7.

The storage of energy by the write pulses and its tendency to mask the induced pulses in the column conductors is more pronounced in twistor arrays than in conventional arrays due to the close spacing between the conductors. In an array of this sort, the advantages of the independent read and write circuits having different frequency spectra are most apparent.

Connected to each row twistor is a write current generator 12, a low-pass filter 13, and a read current generator 14. The current generators and the filter for the first row are the only ones disclosed in the figure. A write current generator 5, low-pass filter 6, high-pass filter 8 and sense amplifier 7 are connected to each column conductor 9 as shown. The elements connected to the first column conductor are the only ones disclosed in the figure.

When it is desired to write a word into a particular row of the array, the appropriate write current generator 12 is operated. This generator causes a current to flow in the selected twistor from left to right and applies a magnetomotive force to each twistor bit in a direction for setting the flux along path 11 from right to left. This magnetomotive force, however, is insufficient for setting any of the bits.

Those bits which it is desired to set have applied to their column conductors bit write current pulses. Current generators 5 apply currents only to those column conductors coupled to those bits in the row in which it is desired to set flux from right to left. The currents from generators 5, as the current from generator 12, are insufficient in themselves for setting flux. However, all coincidences of the two currents set the selected bits in the row. In this manner the desired word is written into the selected row of the array.

Both horizontal and vertical write currents are passed through respective low-pass filters 13 and 6 before they are applied to the array. All high frequency components are removed. The pulses have a large rise time and long duration as shown in FIG. 2A.

The energy stored in the parasitic reactive components such as wire inductance or stray capacitance during the write operation oscillates and dissipates itself. The frequency spectrum of this oscillation is relatively low as the pulses which store the energy in the first place contain no high frequency components.

The read pulses applied to a particular twistor conductor are sufficient in magnitude to switch all flux set along path 11 by the write pulses. Those bits which are switched induce voltages in the respective vertical conductors. Sense amplifiers 7 detect these voltages and determine the word previously written into the twistor wire.

The above-noted advantages of my invention are obtained by the relative frequency content of the read and write pulses. FIG. 2C shows the read pulses to be compared with the write pulse of FIG. 2A, for one specific illustrative embodiment. The read pulses have a pulse width one-tenth that of the write pulses. The read pulses similarly have a shorter rise time than the write pulses. These two features contribute to the high frequency content of the read pulses as compared with the write pulses. The read pulses similarly have a larger magnitude than the row write pulse. This must necessarily be for the read pulse applied to the row conductor must in itself switch the flux along path 11 while the row write pulse must do so only when supported by bit write currents. The large magnitude of the read pulses is further instrumental in differentiating between the frequency content of the write pulses and the pulses induced in the vertical conductors during interrogation. The rapidity with which the flux of a magnetic element switches magnetization is determined, among other things, by the magnitude of the magnetomotive force applied. The large magnitude read pulse causes rapid switching and the induced voltages in the vertical strips, therefore, contain high frequency components.

It should be noted that the bit write pulses applied to the vertical conductors may be of large magnitude, even larger than the read pulses. The coupling between the vertical strips and path 11 is less than the coupling between conductors 10 and paths 11. Consequently, the large bit write currents cannot set the bits in the absence of the word write current from generator 12.

Due to the large magnitude of the bit write currents in the vertical conductors which almost always is greater than the magnitude of the induced currents in these same conductors during the interrogation process, it would appear that simultaneous read and write operations would be impossible as sense amplifiers 7 could not detect the relatively small induced interrogating pulses. The use of different frequency spectra for the read and write operations, however, permits not only a read operation immediately subsequent to a write operation but even the two simultaneously.

That the read operation can occur immediately after a write operation is apparent from FIG. 2B which represents the stored oscillating energy in the parasitic reactive components of the array. This oscillating energy, stored by the row and bit write pulses of relatively long duration, has a period of oscillation that is approximately ten times as great as the read pulse duration. High-pass filters 8 are adjusted to pass only the frequency content of the read pulses. The voltages induced in conductors 9 from the oscillating energy shown in FIG. 2B is of low frequency and, consequently, is not passed by filters 8. The application of a read pulse to a twistor even while the oscillating energy is at a maximum results in a very rapid switching of flux with the consequent fast rise time and short duration induced pulses in the vertical conductors. These pulses of high frequency content are passed by filters 8 to sense amplifiers 7. The second pulse of FIG. 2C is shown occurring immediately subsequent to a write operation, yet, in accordance with my invention, the output signal is not masked by this energy of low frequency.

Furthermore, it is not necessary to wait to read a bit from the array until the writing of another is finished. The first pulse of FIG. 2C shows a read pulse applied to one twistor wire at the same time during which a word is being written into another twistor wire as shown by the pulse of FIG. 2A. The bit write currents applied to the vertical conductors may be in the order of amperes and would appear to completely mask the low magnitude pulse induced in the same vertical conductors by the read pulse as these output signals may be in the order of millivolts. However, the induced pulses contain the high frequency content of the read pulses and pass through high-pass filters 8 with ease. Bit write pulses, on the other hand, are of low frequency content and are completely blocked by high-pass filters 8. Sense amplifiers 7 remain impervious to these large magnitude write pulses and detect only the induced pulses from the interrogation operation even though they are of insignificant magnitude compared with the write pulses on the same conductors.

As read and write operations can occur simultaneously because filters 8 block the write currents from sense amplifiers 7, a third advantage of this invention, the automatic solution to the "blocking" problem, is apparent. Sense amplifiers 7 cannot be "blocked" by the large magnitude write currents as these currents never reach the input of the amplifiers.

Thus, it is seen that the use of independent read and write circuits having different frequency spectra permits independent and even simultaneous read and write operations in addition to permitting the use of simple and low cost sensing equipment.

In one specific embodiment of my invention in accordance with FIG. 1, a 756,000 bit word-organized array was arranged with 2,250 words with 336 bits per word along each twistor wire. This array thus contains 2,250 horizontal twistor wires and 336 vertical copper tapes. An embodiment having a 30-mil spacing between copper tapes having a width of 100 mils has been found to afford the advantages of the invention when the following currents are provided: a word write current of 100 milliamperes magnitude and three microsecond pulse width; a bit write current of 1.3 amperes and three microsecond pulse width; and a word-readcurrent of 300 milliamperes and .3 microsecond pulse width. The output signal had a magnitude of two millivolts and a duration of approximately .3 microsecond. These values are, of course, to be understood as exemplary only of one specific embodiment.

It is apparent that the advantages of this invention may be achieved by the use of passive components only. The low and high pass filters need contain no costly active components.

FIG. 3 is a schematic of a toroidal shaped magnetic core bit-organized memory array illustrating another embodiment of my invention. The general operation of circuits of this type is well known in the art. As the array is bit-organized it is necessary to apply currents to both horizontal and vertical conductors for both read and write operations. A common sense winding 20 threads each core 21 and is connected to high-pass filter 22 which transmits induced high frequency signals to sense amplifier 23.

In this bit-organized array there is no "blocking" problem as the sense amplifier 23 is not connected to the same conductors to which the write currents are applied. However, it has heretofore been impractical to read and write different bits in the array independently and certainly impractical to do so simultaneously. This becomes immediately apparent if one assumes that it is desired to read one core and write into another when the two cores are located in the same row or column. In such a circumstance oppositely directed read and write currents must be applied to the same conductor.

However, the combination of low-pass filters 24 and 25, in accordance with an aspect of my invention, and respective write generators 26 and 27 permits only low frequency currents to be applied to the array during the write operation. Consequently, the stored oscillating energy in the parasitic reactive components is once again of the form shown in FIG. 2B. The read pulses from generators 28 and 29 even when applied simultaneously with write pulses to the same conductors cause the induced voltages in sense winding 20 to be of high frequency content only. These frequencies are passed by filter 22 to sense amplifier 23. The filter completely blocks all voltages induced in the sense winding by the write pulses or the oscillating energy, and independent read and write circuits are achieved in the bit-organized array as well as in the word-organized array of FIG. 1.

One problem presents itself when this frequency division scheme is incorporated with bit-organized arrays. The read pulses must have a magnitude considerably greater than the write pulses. To switch a core a minimum value of the product of the current magnitude and its duration must be applied. For the frequency division scheme to function the read pulse width must be much smaller than the write pulse width, ten times as small in the illustrative embodiments. Thus, the read pulse magnitude must be much greater than the write pulse magnitude.

In coincident current arrays each current must be incapable of switching a core by itself. As the combination of two currents must switch a core it is seen that each current must have a magnitude somewhere between one-half of and the full minimum switching current. If the read current pulse magnitude is much greater than the write current pulse magnitude it is possible that each read pulse individually will switch all cores to which it is applied. The array, then, will not function properly.

This problem, however, can be avoided by the use of bias currents. This technique has been exploited in the past. The bias current, continuously applied to all cores, is in a direction tending to "write" into each core, but being of insufficient magnitude to do so. Consequently the total magnitude of the two coincident write currents that is required is reduced. The magnitude of the read currents, however, must be increased as they must not only supply sufficient magnetomotive force to switch the magnetization of the cores but they must overcome the bias current as well. In this way the read current pulses may be made to have a magnitude that is greater than the write current pulse magnitude by the desired factor.

It is to be understood that the above-described embodiments are only illustrative of the application of the principles of the invention and that various modifications may be made therein without departing from the spirit and scope of the invention.

What is claimed is:

1. A matrix array comprising a plurality of magnetic elements having two stable remanent magnetization states arranged in rows and columns, first conductor means coupled to every element in each of said rows, second conductor means coupled to every element in each of said columns, means selectively connectable to said row and column conductor means for applying current pulses of a first magnitude, rise time and duration to set said elements in a first one of said two stable states, means for selectively applying current pulses of a second magnitude, rise time and duration to said row conductor means to set said elements in the second one of said two stable states, and means including filter means connected to said second conductor means for detecting induced voltages in said second conductor means in response to the application of said second current pulses.

2. A matrix array comprising a plurality of magnetic elements having two stable remanent magnetization states arranged in rows and columns, first conductor means coupled to every element in each of said rows, second conductor means coupled to every element in each of said columns, means selectively connectable to said row and column conductor means for applying energizing pulses of a first duration to set said elements in a first one of said two table states, means for selectively applying energizing pulses of a second duration to said row conductor means to set said elements in the second one of said two stable states, and means including filter means connected to said second conductor means for detecting induced voltages in said second conductor means in response to the switching of said elements to said second stable state.

3. A matrix array comprising a plurality of magnetic elements having two stable remanent magnetization states arranged in rows and columns, first conductor means coupled to every element in each of said rows, second conductor means coupled to every element in each of said columns, first means selectively connectable to said row and column conductor means for applying current pulses having a first frequency spectrum to set said elements in a first one of said two stable states, second means for selectively applying current pulses having a second frequency spectrum to said row conductor means to set said elements in the second one of said two stable states, and means including filter means for detecting the switching of said elements to said second stable state in response to the application of said second current pulses.

4. A matrix array in accordance with claim 3 wherein said first and second current applying means include means for applying pulses having nonoverlapping frequency spectra to said conductor means.

5. A memory array comprising a plurality of magnetic cores arranged in rows and columns, said cores having first and second stable magnetization states, a plurality of conductors coupling every core in each of said rows, a plurality of conductors coupling every core in each of said columns, means for applying currents having a first frequency spectrum to selected ones of said row and column conductors for setting said cores in said first stable state, and means for applying currents having a second frequency spectrum to selected ones of said row and column conductors for setting said cores in said second stable state.

6. An array comprising a plurality of memory devices arranged in rows and columns, said devices having first and second stable states, a plurality of conductor means connected to every device in each of said rows, a plurality of conductor means connected to every device in each of said columns, means for applying pulses having a first frequency spectrum to selected ones of said row and column conductor means for setting said devices in said first stable state, and means for applying pulses having a second frequency spectrum to selected ones of said row and column conductor means for setting said devices in said second stable state.

7. A memory array comprising a plurality of magnetic cores having two stable remanent magnetization states, conductor means coupled to said cores, means for selectively applying electrical pulses having a first frequency spectrum to said conductor means for setting said cores in a first one of said two stable states, and means for selectively applying electrical pulses having a second frequency spectrum to said conductor means for setting said cores in the second one of said two stable states.

8. A memory array comprising a plurality of devices having a first and second stable state, conductor means connected to said devices, means for selectively applying electrical pulses having a first frequency spectrum to said conductor means for setting said devices in said first stable state, and means for selectively applying electrical pulses having a second frequency spectrum to said conductor means for setting said devices in said second stable state.

9. A memory array comprising a plurality of bistable devices arranged in rows and columns, a plurality of first conductor means, one of said first conductor means connected to every device in each of said rows, a plurality of second conductor means, one of said second conductor means connected to every device in each of said columns, first pulse energizing means selectively connectable to said row and column conductor means for setting said devices in a first stable state, second pulse energizing means selectively connectable to said row conductor means for setting said devices in a second stable state, first filter means interposed between said first pulse energizing means and said row and column conductor means for transmitting only first predetermined frequency components from said first pulse energizing means to said row and column conductor means, detector means connected to said column conductor means for sensing electrical signals in said column conductor means in response to the switching of said devices to said second stable state, and second filter means for transmitting only second predetermined frequency components in said electrical signals from said column conductor means to said detector means.

10. A memory array comprising a plurality of bistable devices arranged in rows and columns, a plurality of first conductor means, one of said first conductor means connected to every device in each of said rows, a plurality of second conductor means, one of said second conductor means connected to every device in each of said columns, first pulse energizing means selectively connectable to said row and column conductor means for setting said devices in a first stable state, second pulse energizing means selectively connectable to said row conductor means for setting said devices in a second stable state, detector means connected to said column conductor means for sensing electrical signals produced in said column conductor means in response to the switching of said devices to said second stable state, and filter means for transmitting only predetermined frequency components in said electrical signals from said column conductor means to said detector means.

11. A memory array comprising a plurality of bistable devices, a plurality of conductor means connected to said devices, first pulse energizing means selectively connectable to said conductor means for setting said devices in a first stable state, second pulse energizing means selectively connectable to said conductor means for setting said devices in a second stable state, first filter means interposed between said first pulse energizing means and said conductor means for transmitting only predetermined frequency components from said first pulse energizing means to said conductor means, detector means connected to said conductor means for sensing electrical signals in said conductor means in response to the setting of said devices in said second stable state, and second filter means for transmitting only predetermined frequency components in said electrical signals from said conductor means to said detector means.

12. A memory array comprising a plurality of magnetic cores having first and second magnetization states, means for applying first magnetomotive forces having a first frequency spectrum to said cores for setting said cores in said first magnetization state, means for applying second magnetomotive forces having a second frequency spectrum to said cores for setting said cores in said second magnetization state, sensing means connected to said cores, and means for detecting signals containing only frequencies within said second frequency spectrum induced in said sensing means by the switching of said cores to said second magnetization state.

13. A memory array comprising a plurality of bistable device having first and second stable states, means for applying first signals having a first frequency spectrum to said devices for setting said devices in said first stable state, means for applying second signals having a second frequency spectrum to said devices for setting said devices in said second stable state, sensing means connected to said devices, and means for detecting signals containing only frequencies within said second frequency spectrum produced in said sensing means by the switching of said devices to said second stable state.

14. A memory array comprising a plurality of magnetic conductors having a preferred helical flux path, a plurality of nonmagnetic conductors inductively coupled to said plurality of magnetic conductors, means selectively connectable to said magnetic and nonmagnetic conductors for applying first current pulses having a first frequency spectrum to establish first flux directions along said helical paths, means for selectively applying second current pulses having a second frequency spectrum to said magnetic conductors for establishing second flux directions along said helical paths, and means for detecting voltages having only said second frequency spectrum induced in said nonmagnetic conductors responsive to the switching of said flux directions by said second pulses.

15. A memory array comprising a plurality of magnetic conductors having a preferred helical flux path, a plurality of nonmagnetic conductors inductively coupled to said plurality of magnetic conductors, means for selectively applying first magnetomotive forces having a first frequency spectrum to establish first flux directions along said helical paths at the intersections of said magnetic and nonmagnetic conductors, means for selectively applying second magnetomotive forces having a second frequency spectrum to establish second flux directions along said helical paths at the intersections of said magnetic and nonmagnetic conductors, and means for detecting voltages having only said second frequency spectrum induced in said nonmagnetic conductors responsive to the switching of said flux directions by said second magnetomotive force applying means.

16. A memory array comprising a plurality of magnetic conductors having a preferred helical flux path, a plurality of nonmagnetic conductors inductively coupled to said plurality of magnetic conductors, means for selectively applying first magnetomotive forces having a first frequency spectrum to establish first flux directions along said helical paths at the intersections of said magnetic and nonmagnetic conductors, means for selectively applying second magnetomotive forces having a second frequency spectrum to establish second flux directions along said helical paths at the intersections of said magnetic and nonmagnetic conductors, and means for detecting the switching of said flux to said second direction.

17. In a magnetic memory matrix wherein information is written in bistable remanent magnetic elements and read out from said elements, means for preventing energy stored in reactive components during the writing process from degenerating the signal read out during the reading process, said means comprising means for generating write pulses of a low frequency spectrum, means for generating reading pulses of a high frequency spectrum, and output signal detector means including filter means for rejecting energy of said low frequency spectrum and for passing energy of said high frequency spectrum.

18. A magnetic memory matrix comprising a plurality of magnetic elements each having two stable states of magnetic remanence, means for setting said magnetic elements to store information in selected ones of said elements and means for readijng out said stored information in said selected elements without interaction between said setting and said read-out means, said setting means including write current source means for generating write pulses of a first duration and a first rise time and said read-out means including read current source means for generating read pulses of a shorter duration and having a shorter rise time, detector means for detecting the resetting of said selected elements, and filter means connected to said detector means.

19. A matrix array comprising a plurality of magnetic elements having two stable remanent magnetization states, said elements being arranged in rows and columns, first conductor means individually coupled to every element in each of said rows, second conductor means individually coupled to every element in each of said columns, means selectively connectable to said row conductor means and said column conductor means for applying energizing signals having a first frequency spectrum to write information into said elements, means selectively connectable to said row conductor means for applying energizing signals having a second frequency spectrum to interrogate said elements, means connected to said row conductor means for minimizing second frequency spectrum components in said energizing signals having said first frequency spectrum, means for detecting signals induced in said column conductor means in response to the application of said energizing signals having said second frequency spectrum, and filter means connected to said detecting means for preventing the detection of signals induced in said column conductor means in response to the application of said energizing signals having said first frequency spectrum.

20. A matrix array comprising a plurality of magnetic elements having two stable remanent magnetization states arranged in rows and columns, first conductor means coupled to every element in each of said rows, second conductor means coupled to every element in each of said columns, third conductor means coupled to each of said elements, means selectively connectable to said row and column conductor means for applying energizing signals having a first frequency spectrum to write information into said elements, means selectively connectable to said row and column conductor means for applying energizing signals having a second frequency spectrum to interrogate said elements, means connected to said row conductor means for suppressing second frequency components in said energizing signals having said first frequency spectrum, means for detecting signals induced in said third conductor means in response to the application of said energizing signals having said second frequency spectrum, and filter means connected to said detecting means for preventing the detection of signals induced in said third conductor means in response to the application of said energizing signals having said first frequency spectrum.

21. A memory array comprising a plurality of memory devices, first means for selectively applying signals having a first frequency spectrum to said devices for writing information into said devices, second means for selectively applying signals having a second frequency spectrum to said devices for interrogating said devices, means connected to said devices for detecting changes in said devices produced by the application of said interrogating signals, and means connected to said detecting means for preventing said detecting means from operating responsive to changes in said devices produced by the application of said writing signals.

22. A memory circuit comprising a memory device, first means for applying a signal having a first frequency spectrum to said device, second means for applying a signal having a second frequency spectrum to said device, means connected to said device for detecting changes in said device produced by the application of said second signal, and means connected to said detecting means for preventing said detecting means from operating responsive to changes in said device produced by the application of said first signal.

References Cited in the file of this patent

UNITED STATES PATENTS

| | | |
|---|---|---|
| 2,845,611 | Williams | July 29, 1958 |
| 2,958,074 | Kilburn | Oct. 25, 1960 |